United States Patent
Kim et al.

(10) Patent No.: US 9,906,771 B2
(45) Date of Patent: Feb. 27, 2018

(54) LIGHT-FIELD CAMERA

(71) Applicant: SAMSUNG ELECTRONICS CO., LTD., Suwon-si (KR)

(72) Inventors: Yunhee Kim, Seoul (KR); Sunghyun Nam, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 15/000,246

(22) Filed: Jan. 19, 2016

(65) Prior Publication Data
US 2016/0241840 A1 Aug. 18, 2016

(30) Foreign Application Priority Data

Feb. 17, 2015 (KR) ........................ 10-2015-0024305

(51) Int. Cl.
*H04N 5/225* (2006.01)
*H04N 13/02* (2006.01)
*H04N 13/04* (2006.01)
*G02B 27/00* (2006.01)
*H04N 5/369* (2011.01)
*G02B 5/04* (2006.01)
*G02B 26/00* (2006.01)
*G02B 3/00* (2006.01)

(52) U.S. Cl.
CPC ..... *H04N 13/0228* (2013.01); *G02B 27/0075* (2013.01); *H04N 5/2254* (2013.01); *H04N 5/3696* (2013.01); *H04N 13/0232* (2013.01); *H04N 13/04* (2013.01); *G02B 3/0056* (2013.01); *G02B 5/045* (2013.01); *G02B 26/005* (2013.01)

(58) Field of Classification Search
None
See application file for complete search history.

(56) References Cited

U.S. PATENT DOCUMENTS

| 4,734,779 A | * | 3/1988 | Levis | ........................ H04N 9/12 345/1.3 |
| 6,556,349 B2 | | 4/2003 | Cox et al. | |
| 8,400,555 B1 | | 3/2013 | Georgiev et al. | |
| 8,593,564 B2 | | 11/2013 | Border et al. | |
| 2004/0135916 A1 | * | 7/2004 | Makii | .................. H04N 5/2254 348/335 |

(Continued)

FOREIGN PATENT DOCUMENTS

| JP | 2005-136325 A | 5/2005 |
| JP | 5369563 B2 | 12/2013 |

(Continued)

OTHER PUBLICATIONS

Ren Ng et al.; "Light Field Photography with a Hand-held Plenoptic Camera"; Stanford Tech Report; CTSR 2005-02; Apr. 20, 2005, 11 pages total.

*Primary Examiner* — Stephen Coleman
(74) *Attorney, Agent, or Firm* — Sughrue Mion, PLLC

(57) ABSTRACT

A light-field camera includes a main lens configured to form an image of an object, a lens configured to form, on a curved surface, additional images based on the image of the object, and an image sensor configured to function as a curved image sensor and thereby sense the additional images, at least one of the lens and the image sensor including a flat element.

20 Claims, 11 Drawing Sheets

(56) References Cited

U.S. PATENT DOCUMENTS

2005/0030408 A1\* 2/2005 Ito .................. H04N 5/2253
                                                          348/340
2006/0092311 A1\* 5/2006 Hartlove ............ G02B 7/08
                                                          348/340

FOREIGN PATENT DOCUMENTS

KR           10-0618456 B1    8/2006
KR     10-2013-0112541 A     10/2013

\* cited by examiner ized but an image resolution is increased by making a distance between a lens array and an image sensor longer (a real image) or shorter (a virtual image) than a focal length. However, when this method is used, an image formed by a main lens is stored in an image sensor via a lens array. Thus, a viewing angle of a 3-dimensional image with respect to an object may be limited and narrowed.

LIGHT-FIELD CAMERA

CROSS-REFERENCE TO RELATED APPLICATION

This application claims priority from Korean Patent Application No. 10-2015-0024305, filed on Feb. 17, 2015, in the Korean Intellectual Property Office, the disclosure of which is incorporated herein by reference in its entirety.

BACKGROUND

1. Field

The exemplary embodiments disclosed herein relate to a camera, and more particularly, to a light-field camera having a micro-lens array.

2. Description of the Related Art

In a method of taking a plurality of parallax images by using a single camera, a lens array is disposed between an image sensor and an imaging lens of the camera to store a light-field. According to this method, after storing information about an optical direction of a 2D type, an image focus may be re-controlled via post processing. Also, depth information of the pictured image may be extracted by calculating 3D information in the post processing.

Generally, as a distance of light from an optical axis of a lens increases, an effective focal length of the light is reduced. Accordingly, an image of an object is not formed on a flat plane, but instead is formed on a curved surface that is referred to as a Petzval surface.

In the case of a light-field camera of the related art, a light-field image is obtained by positioning a flat lens array in front of a flat image sensor. Accordingly, an image of light that is far away from an optical axis of the light-field camera is far away from a focus position, that is, the flat image sensor, and thus, noise is increased and optical efficiency is also reduced.

A light-field camera can be used to obtain directional optical information of an object by fixing a distance between a lens array and an image sensor, that is, a distance corresponding to a focal length of a lens array, but image resolution may be reduced. In order to solve this problem, a method has been disclosed, whereby an angle resolution is reduced but an image resolution is increased by making a distance between a lens array and an image sensor longer (a real image) or shorter (a virtual image) than a focal length. However, when this method is used, an image formed by a main lens is stored in an image sensor via a lens array. Thus, a viewing angle of a 3-dimensional image with respect to an object may be limited and narrowed.

SUMMARY

Exemplary embodiments provide light-field cameras that allow a user to take high resolution images and wide viewing angle 3-dimensional images by using an entire image sensor region.

Additional aspects will be set forth in part in the description which follows and, in part, will be apparent from the description, or may be learned by practice of the presented exemplary embodiments.

According to an aspect of an exemplary embodiment, a light-field camera includes: a main lens configured to form an image of an object; a lens configured to form, on a curved surface, additional images based on the image of the object; and an image sensor unit configured to function as a curved image sensor and thereby sense the additional images, wherein at least one of the lens and the image sensor comprises a flat element.

The lens may include a curved micro-lens array.

The image sensor may include a waveform conversion element configured to convert a waveform of light incident thereon, the light forming the additional images, and a flat image sensor configured to sense the additional images based on the converted waveform.

The waveform conversion element may include a material layer that covers a light-incident surface of the flat image sensor and has a positive power, may be a prism lens layer having a positive power, or may be an electrowetting prism layer. The material layer may have a convex surface.

The curved micro-lens array may be placed on a Petzval surface of the main lens and may have a same curvature as the Petzval surface.

The main lens and the curved micro-lens array may be configured such that the image formed by the main lens is located between the curved micro-lens array and the main lens.

The lens unit may include a waveform conversion element configured to convert a waveform of light incident thereon, the light forming the additional images, and a flat micro-lens array, and the image sensor unit may include a curved image sensor configured to sense the additional images based on the converted waveform.

The waveform conversion element may include a lens having a positive power, a material layer that covers a light-incident surface of the flat micro-lens array and has a positive power, or an electrowetting prism layer.

The lens may have a convex light-incident surface and may have a light-exit surface having a plurality of micro-lens shapes.

The lens may include a first waveform conversion element and a flat micro-lens array, and the image sensor unit may include a second waveform conversion element and a flat image sensor.

The waveform conversion element may include a Fresnel lens, a holographic optical element (HOE), or a diffraction optical element (DOE).

The lens may include a first waveform conversion element and a flat micro-lens array, and the image sensor may include a second waveform conversion element and a flat image sensor.

The additional images may have different parallax from each other.

According to an aspect of another exemplary embodiment, a light-field camera includes: a main lens configured to form an image of an object; a liquid crystal panel configured to form a 2-dimensional image or a 3-dimensional image based on the image of the object; and an image sensor configured to sense the 2-dimensional image or the 3-dimensional image.

The image sensor may further include a waveform conversion element configured to convert a waveform of light incident thereon, the light forming the 2-dimensional image or the 3-dimensional image.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
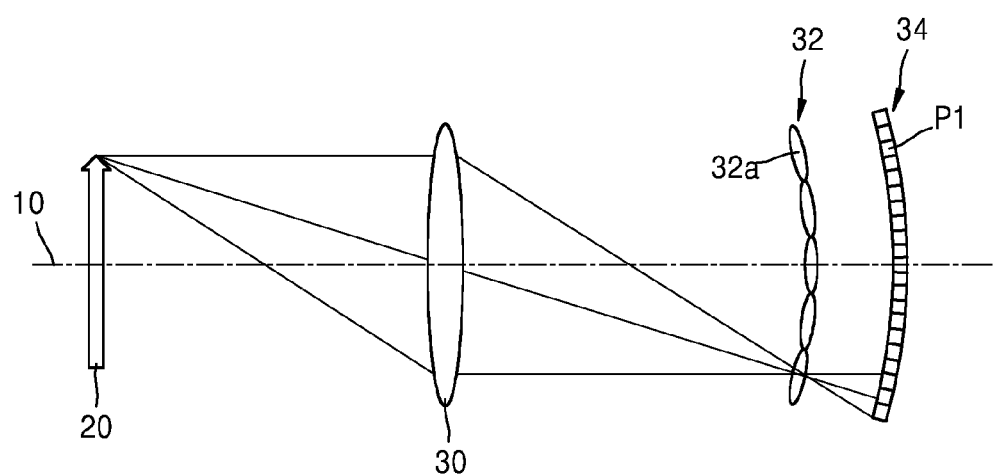
FIGS. 1 and 2 are cross-sectional views illustrating examples of locations of a micro-lens array and an image sensor according to an exemplary embodiment.

Reference will now be made in detail to exemplary embodiments, examples of which are illustrated in the accompanying drawings. In the drawings, thicknesses of layers and regions may be exaggerated for clarity of layers and regions.

FIG. 1 is a cross-sectional view of a light-field camera according to an exemplary embodiment.

Figure 2:
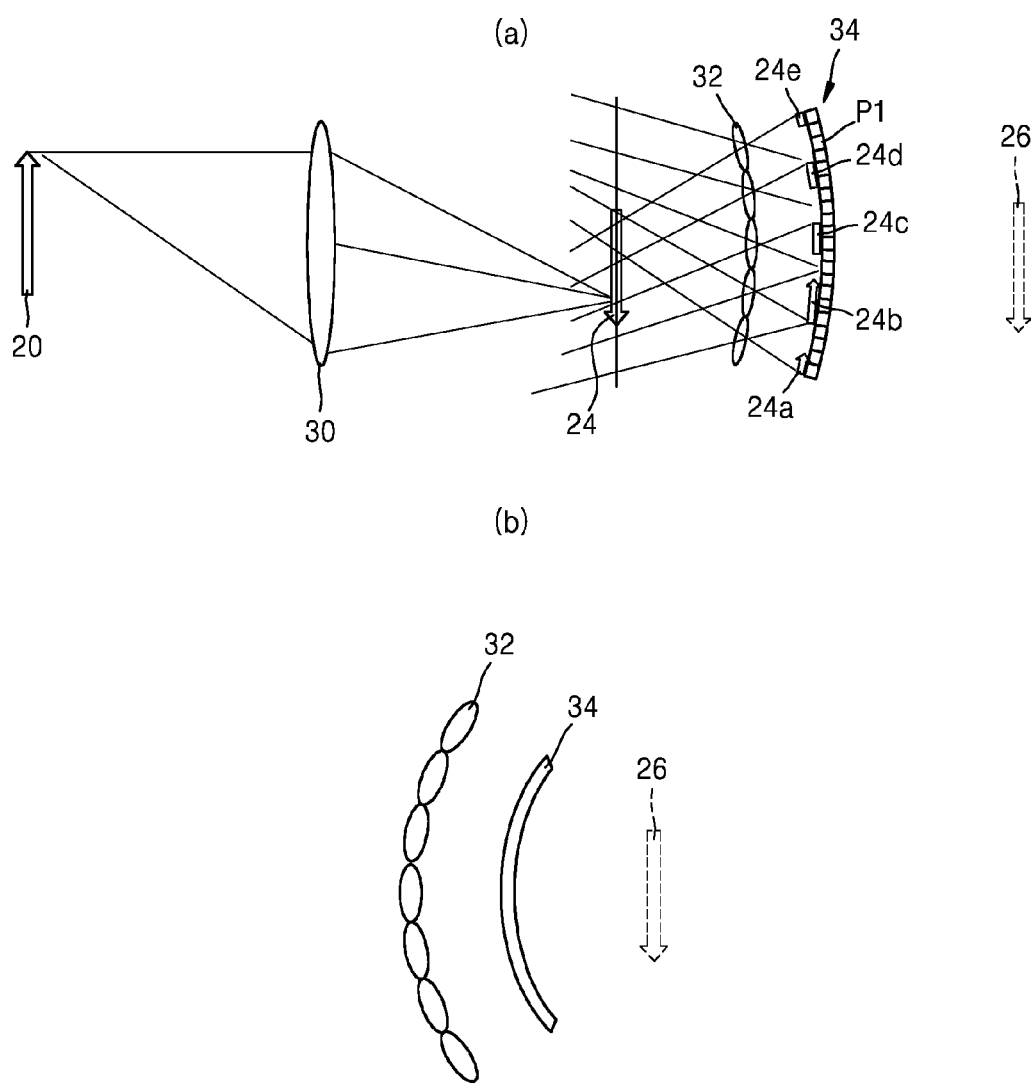

Referring to FIG. 1, the light-field camera may include a main lens 30 that forms an image of an object 20 at a first location, a micro-lens array 32 that transmits the image formed at the first location to an image sensor 34 as a plurality of images of the object 20, and the image sensor 34 on which a light-field transmitted through the micro-lens array 32, that is, images of the object 20, is recorded. The image sensor 34 includes a plurality of pixels P1. A filter may be disposed on optical incident surfaces of the pixels P1. The filter may include, for example, a bayer pattern layer. The first location may be a location between the main lens 30 and the image sensor 34. The first location may be located on a focal curve or a Petzval surface of the main lens 30. As shown in FIG. 2, the first location may be a location between the main lens 30 and the micro-lens array 32. The main lens 30 may be a convex lens, and also, may be a lens optical system formed of a plurality lenses including a convex lens. According to an exemplary embodiment, the lens optical system may have a positive power. The micro-lens array 32 may be located at a location where a focal curve or a Petzval surface of the main lens 30 meets an optical axis 10. At this point, the micro-lens array 32 may be located on the focal curve or a Petzval surface of the main lens 30. Accordingly, the micro-lens array 32 may have a curvature which is the same as the focal curve or a Petzval surface. The micro-lens array 32 may be formed of a plurality of micro-lenses 32a. The micro-lenses 32a respectively may have a positive power. The image sensor 34 may be located at a focal distance of the micro-lens array 32. The image sensor 34 may have the same curvature as the micro-lens array 32.

The micro-lens array 32 and the image sensor 34 are disposed as described above. Thus, of the light that is incident to the micro-lens array 32 through the main lens 30, information (e.g., an image) of the light that is incident to an edge portion of the micro-lens array 32, that is, information of the light that forms a large angle with the optical axis 10, may also reach the image sensor 34. Accordingly, an image of the object 20 may be sensed by using an entire region of the image sensor 34. Also, since the micro-lens array 32 and the image sensor 34 have curved surfaces, an image formed through an edge portion of the micro-lens array 32 may also be clearly formed on the image sensor 34.

As a result, light-field noise of light incident through the edge portion of the micro-lens array 32 is reduced, and 3-dimensional information of high optical efficiency may be correctly obtained.

FIG. 2 is a cross-sectional view illustrating a case when an image 24 of the object 20 of FIG. 1 is located between the main lens 30 and the micro-lens array 32. The micro-lens array 32 may be located on the Petzval surface of the main lens 30 or on a curve that is the center of the image 24. That is, a distance between the image 24 and the micro-lens array 32 may be a minimum radius of curvature of the micro-lens array 32. The micro-lens array 32 may have a radius of curvature greater than the minimum radius of curvature. In FIG. 2, the image sensor 34 may have a radius of curvature which is the same as or different from a radius of curvature from the micro-lens array 32. For example, the curvature of the image sensor 34 may be greater than 0 (when the image sensor 34 is flat) and smaller than a curvature of the micro-lens array 32.

In FIG. 2, the micro-lens array 32 and the image sensor 34 may include a curved surface having a radius of curvature. According to various parameters of the light-field camera system, some or all of the micro-lenses 32a included in the micro-lens array 32 may have image information, and 2-dimensional images 24a through 24e with respect to the object 20 are distributed on an entire region of the image sensor 34. The various parameters may be, for example, a radius of curvature of the micro-lens array 32, a location where the image 24 of the object 20 is formed, and the size of the image 24. In FIG. 2, the image sensor 34 may receive a light-field while having a wide viewing angle of the image 24, and thus, 3-dimensional information having a wide viewing angle may be obtained.

Also, as depicted in FIG. 2, an image 26 of the object 20 may be formed on a right side of the image sensor 34. This image 26 is a virtual image. The location of the image 26 may be controlled by moving the position of the main lens 30. In the case that the image 26 of the object 20 is formed on a right side of the image sensor 34, as depicted in (a) and (b) of FIG. 2, the configuration shown in (b) of FIG. 2 may have a radius of curvatures of the micro-lens array 32 and the image sensor 34 opposite to the radius of curvatures of the configuration shown in (a) of FIG. 2. In the configuration shown in (b) of FIG. 2, the location of the image 26 may be the center of the radius of curvatures of the micro-lens array 32 and the image sensor 34. Also, in this case, the same effect as in the configuration shown in (a) may be obtained.

FIGS. 3 through 19 are cross-sectional views illustrating examples of modified versions of the light-field camera of FIG. 1. The modification examples are modifications of the micro-lens array 32 and the image sensor 34, and thus, the modifications may also be combined with the configurations shown in FIG. 2.

Like reference numerals are used to indicate elements that are substantially identical to the elements of FIGS. 1 and 2, and thus the detailed descriptions thereof will not be repeated.

Figure 3:
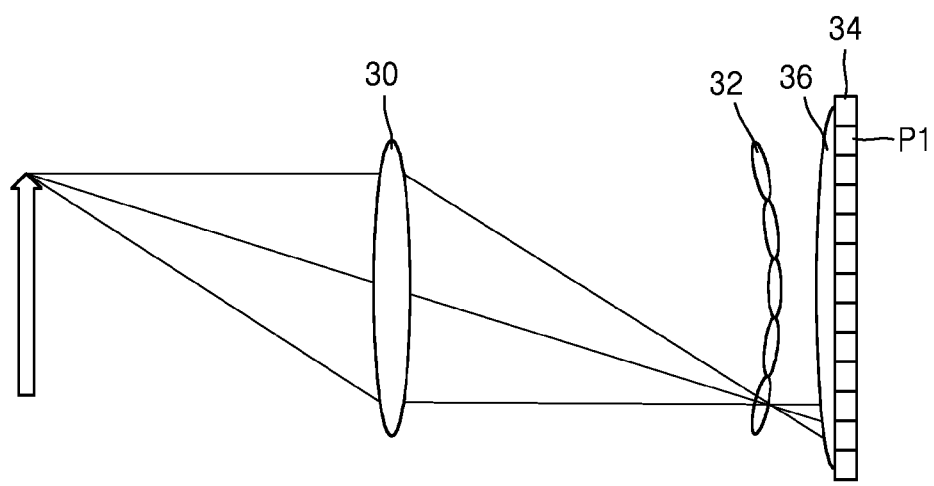
FIGS. 3, 4, 5, 6, 7, 8, 9, 10, 11, 12, 13, 14, 15, 16, 17, 18 and 19 are cross-sectional views illustrating examples of modified versions of the light-field camera of FIG. 1.
Figure 4:
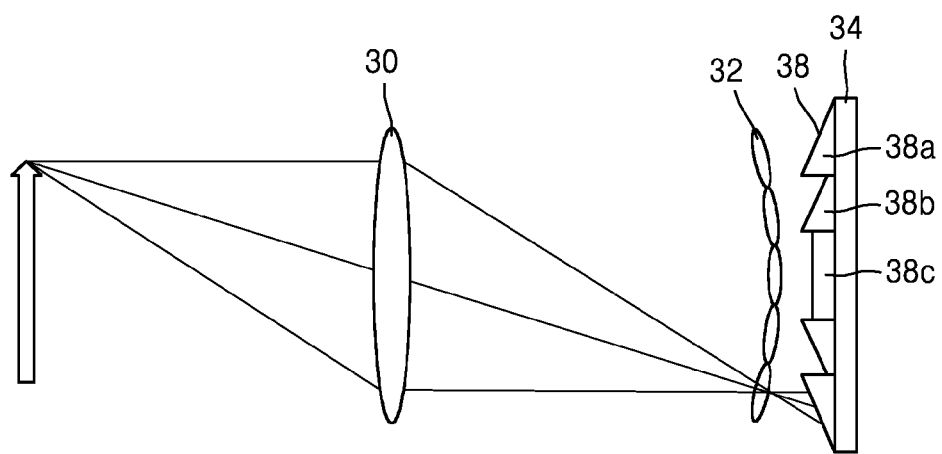
Figure 5:
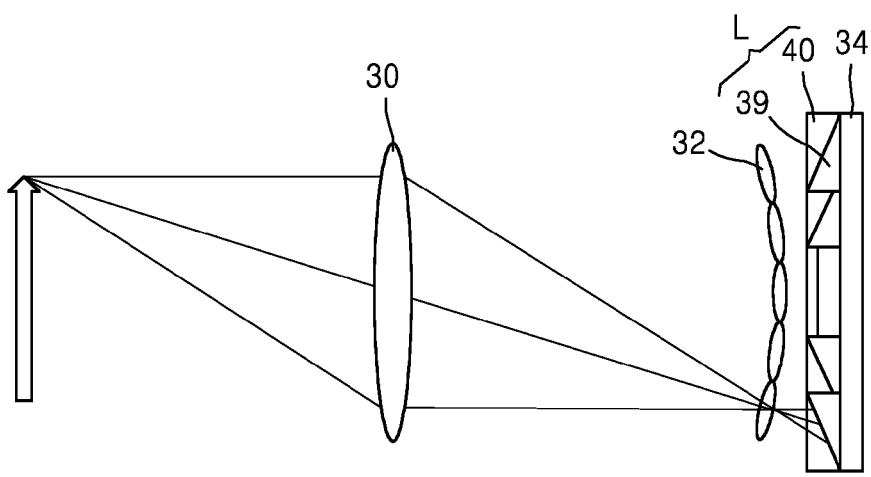

FIGS. 3 through 5 are cross-sectional views illustrating a light-field camera having an image sensor unit instead of the image sensor 34 of FIG. 1.

Referring to FIG. 3, the image sensor 34 and a convex lens material layer 36 are disposed on a right side of the micro-lens array 32. The image sensor 34 and the convex lens material layer 36 may constitute a first image sensor unit (e.g., "first image sensor"). The image sensor 34 is flat. The convex lens material layer 36 may cover a light-incident surface of the image sensor 34. The convex lens material layer 36 may convex towards the micro-lens array 32. The convex lens material layer 36 may be one of various types of elements that convert a waveform of incident light. The convex lens material layer 36 functions as a convex lens to change light incident to the convex lens material layer 36 to be converging light. That is, the velocity of light incident to the convex lens material layer 36 reaching the image sensor 34 gradually increases in a direction moving away from the center towards the edges of the convex lens material layer 36. Other waveform conversion elements described below may achieve the same effect. The conversion of waveforms may result in the same effects as the curve of the image sensor 34 of FIG. 1. That is, the first image sensor unit may sense information in the same way as a curved image sensor senses information. Accordingly, a plurality of images that may be formed by the micro-lens array 32 may be sensed on an entire region of the first image sensor unit.

Referring to FIG. 4, the image sensor 34 and a prism lens layer 38 are disposed on a tight side of the micro-lens array 32. The image sensor 34 and the prism lens layer 38 may constitute a second image sensor unit (e.g., second image sensor). The image sensor 34 is flat. The prism lens layer 38 may be a passive element. The prism lens layer 38 includes a plurality of prisms 38a through 38c. The prism lens layer 38 may be an element that converts a waveform of incident light. The prism lens layer 38 may achieve the same effect as a convex lens. Accordingly, the second image sensor unit, like the first image sensor unit, may also achieve the same effect as the image sensor 34 of FIG. 1. The plural prisms 38a, 38b and 38c of the prism lens layer 38 have an arrangement for changing incident light to convergent light. For this purpose, inclination angles with respect to the image sensor 34 at a boundary surface of the prisms 38a through 38c may be different from each other. The prisms 38a through 38c may be disposed to form a concentric circle with respect to an optical axis. In subsequent drawings from FIG. 4, pixels P1 of the image sensor 34 are omitted.

Referring to FIG. 5, the image sensor 34 and an electrowetting lens layer L are disposed on a right side of the micro-lens array 32. The image sensor 34 is flat. The image sensor 34 and the electrowetting lens layer L may constitute a third image sensor unit (e.g., "third image sensor"). The electrowetting lens layer L may be an active element that is operated by an external electrical signal. The electrowetting lens layer L includes a first liquid layer 39 and a second liquid layer 40. The first liquid layer 39 and the second liquid layer 40 may have different refractive indexes from each other. The first liquid layer 39 may be, for example, an oil layer. An inclination angle at an interface of the first liquid layer 39 and the second liquid layer 40 may vary according to a voltage applied to the electrowetting lens layer L. Accordingly, the electrowetting lens layer L may be a waveform conversion element, and may perform as a concave lens or a convex lens through the voltage application. Accordingly, the combination of the electrowetting lens layer L and the image sensor 34, that is, the third image sensor unit, may also achieve the same effect as the image sensor 34 of FIG. 1.

The electrowetting lens layer L may be an electrowetting prism layer. An example of the electrowetting prism layer is disclosed in detail, for example, in Korean Patent Application No. 10-2012-148870 or Korean Patent Application No. 10-2013-82296.

FIGS. 6 through 10 are cross-sectional views illustrating various lens units disposed on the location of the micro-lens array 32 of FIG. 1.

Figure 6:
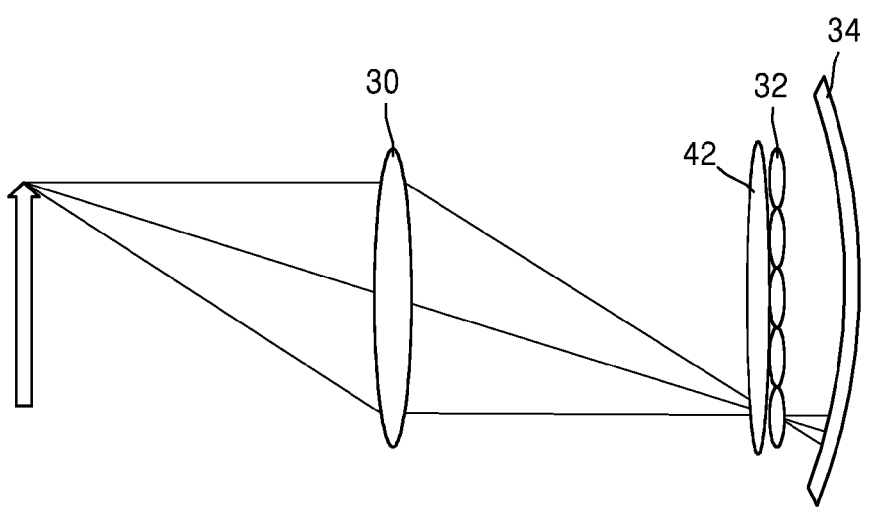

Referring to FIG. 6, a convex lens 42 as a waveform conversion element is disposed on an incident surface of the micro-lens array 32. The micro-lens array 32 is flat. The micro-lens array 32 and the convex lens 42 may constitute a first lens unit (e.g., first lens). The convex lens 42 may perform similar functions as the functions performed by the convex lens material layer 36 of FIG. 3. Accordingly, the velocity of light incident to the convex lens 42 reaching the micro-lens array 32 gradually increases from the center of the convex lens 42 towards the edge of the convex lens 42. This effect is the same effect as the effect achieved by the micro-lens array 32 having a curved surface of FIG. 1. As a result, the first lens unit achieves the same effect as the effect achieved by the micro-lens array 32 of FIG. 1.

Figure 7:
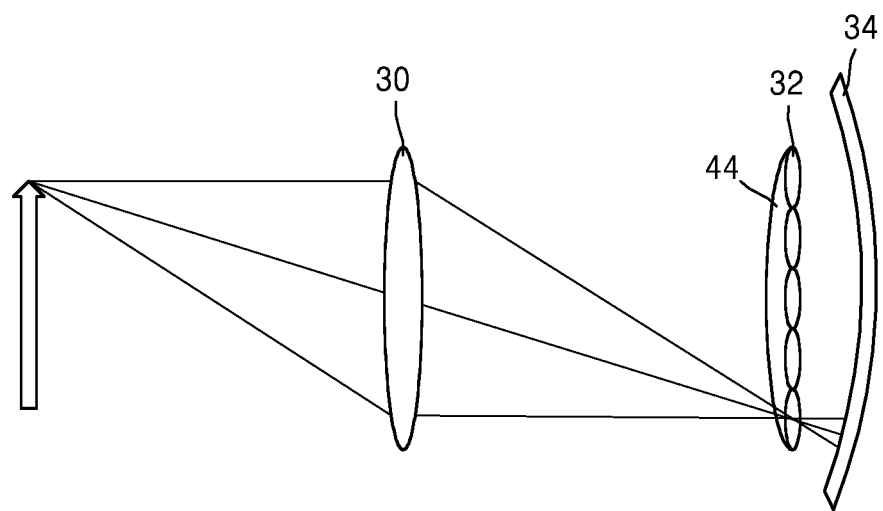

Referring to FIG. 7, the incident surface of the micro-lens array 32 is covered by a material layer 44 having a positive power. The micro-lens array 32 and the material layer 44 may constitute a second lens unit (e.g., second lens). The micro-lens array 32 and the material layer 44 may have the same or different refractive indexes. The micro-lens array 32 is flat. A surface of the material layer 44 facing the main lens 30 is bulging. The material layer 44 may function as a convex lens, and may be an element that changes a wave form of incident light. Accordingly, the second lens unit also may perform the same function as the function performed by the micro-lens array 32 of FIG. 1.

Figure 8:
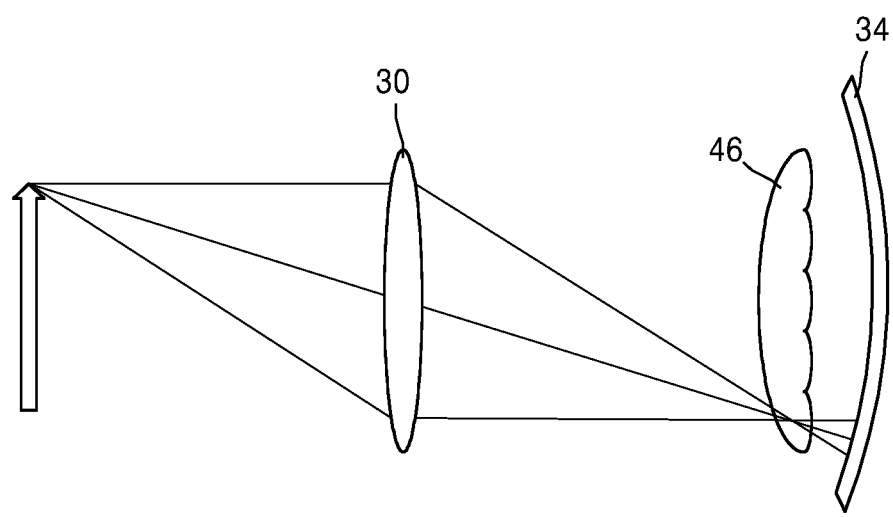

FIG. 8 illustrates a resultant product 46 of combining the micro-lens array 32 and the material layer 44 into one combined unit. The resultant product 46 of FIG. 8 may be achieved when the micro-lens array 32 and the material layer 44 are formed of the same material. The resultant product 46 has a convex light-incident surface and a light-exit surface having a shape of a plurality of micro lenses. The resultant product 46 may constitute a third lens unit (e.g., third lens).

Figure 9:
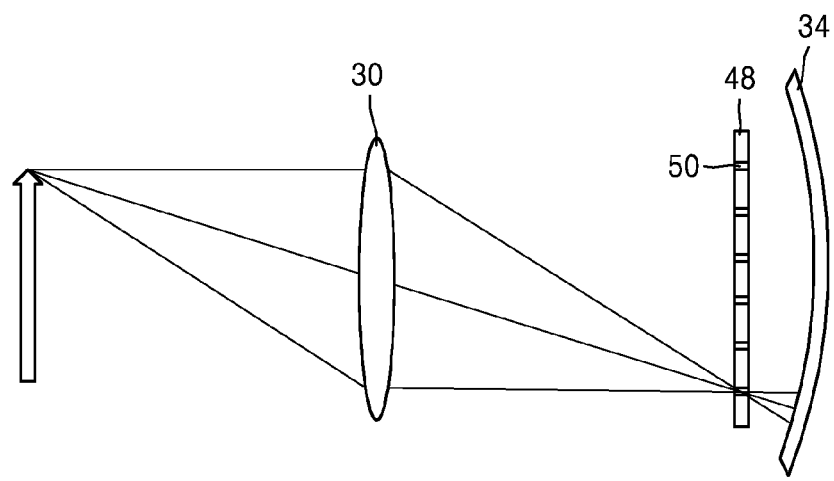
Figure 10:
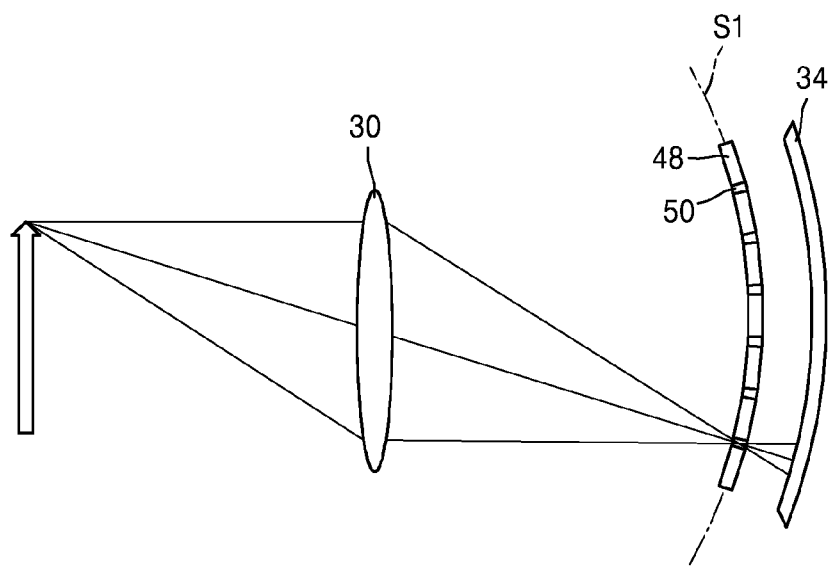
Figure 11:
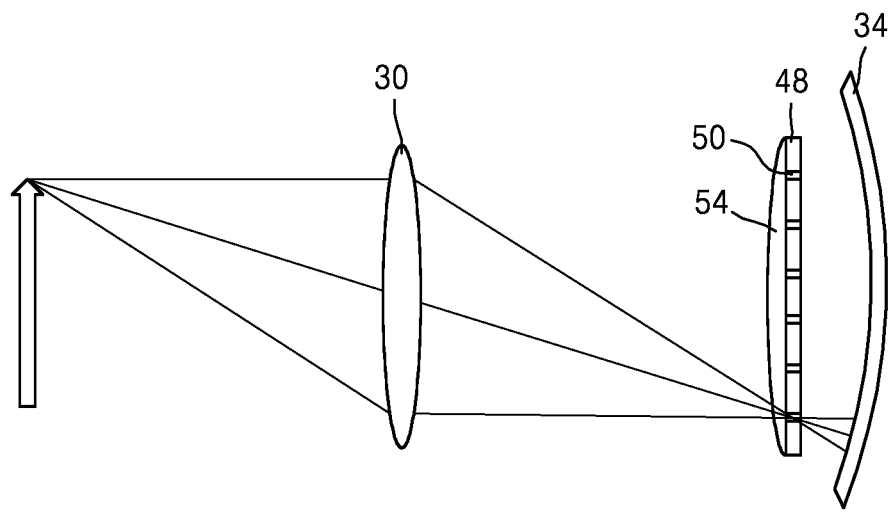

FIGS. 9 through 11 illustrate configuration in which a liquid crystal panel 48 is formed on the location of the micro-lens array 32. The liquid crystal panel 48 may be, for example, a liquid crystal panel that is used in display devices. The liquid crystal panel 48 may be driven in the same fashion as a material layer having a plurality of pinholes by a driving voltage. That is, the liquid crystal panel 48 may function as a pinhole array. In the liquid crystal panel 48, transmission regions 50 correspond to the pinholes. Light is transmitted only through the transmission regions 50. At this point, a light-field (or a plurality of parallax images) may be obtained on the image sensor 34. The entire liquid crystal panel 48 may be a transmission region through the driving of the liquid crystal panel 48, and accordingly, a 2-dimensional image may be obtained on the image sensor 34.

When the liquid crystal panel 48 functions as a pinhole array, that is, when the liquid crystal panel 48 performs a function of providing a plurality of parallax images to the image sensor 34 like the micro-lens array 32 described above, and when the liquid crystal panel 48 has flexibility, as depicted in FIG. 10, the liquid crystal panel 48 may be disposed on a Petzval surface (or a focal surface) S1 of the main lens 30. According to this configuration, the curvature of the liquid crystal panel 48 may be the same as or similar to a curvature of the Petzval surface S1 of the main lens 30.

Instead of modifying the liquid crystal panel 48 to include a curved surface, a waveform conversion element 54 may be disposed in front of the liquid crystal panel 48 as depicted in FIG. 11, to obtain the same effect as in FIG. 10.

As the liquid crystal panel 48 described above is included, the same effect as the micro-lens array 32 having a curved surface may be obtained.

Figure 12:
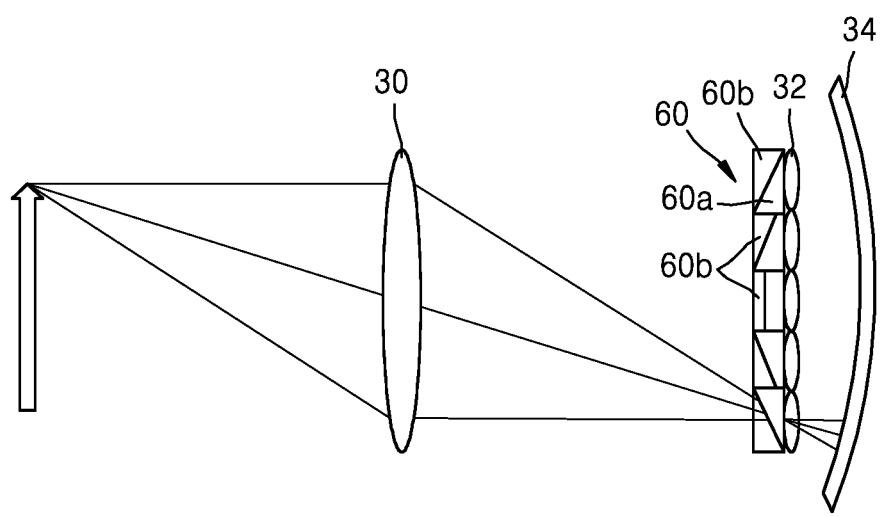

FIG. 12 illustrates a configuration in which as electrowetting lens layer 60 is provided together with the micro-lens array 32 in the location of the micro-lens array 32 of FIG. 1. The electrowetting lens layer 60 and the micro-lens array 32 may constitute a fourth lens unit (e.g., fourth lens). The micro-lens array 32 is flat. The electrowetting lens layer 60 may include third and fourth liquid layers 60a and 60b having refractive indexes different from each other. The electrowetting lens layer 60 may be the same as the electrowetting lens layer L1 described with reference to FIG. 5. Accordingly, the electrowetting lens layer 60 and the flat micro-lens array 32 may achieve the same effect as the effect achieved by the micro-lens array 32 having a curvature of FIG. 1.

As described above, various different types of units may be substituted in place of the micro-lens array 32 and the image sensor 34 of FIG. 1. Accordingly, there may be a plurality of combinations with respect to the micro-lens array 32 and the image sensor 34 of FIG. 1, and each of the combinations may be different examples of modification.

Some exemplary embodiments of the modifications are shown in FIGS. 13 through 19. Besides the exemplary embodiments of the modifications that are shown in FIGS. 13 through 19, there may be further combinations with respect to the micro-lens array 32 and the image sensor 34 of FIG. 1. Waveform conversion elements includes in lens units of FIGS. 13 through 19 may be referred to as first waveform conversion elements, and waveform conversion elements included in image sensor units may be referred to as second waveform conversion elements. The waveform conversion elements may be referred to as waveform conversion devices.

Figure 13:
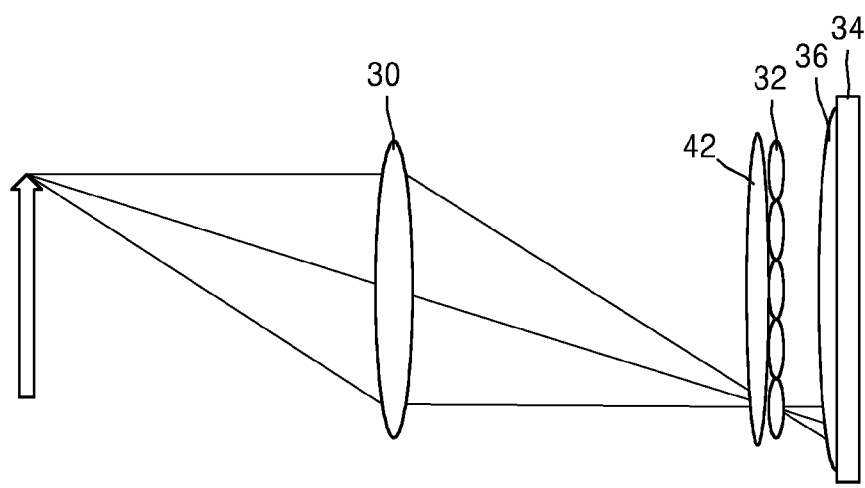

FIG. 13 shows a configuration in which the micro-lens array 32 of FIG. 1 is replaced by the first lens unit of FIG. 6 and the image sensor 34 of FIG. 1 is replaced by the first image sensor unit of FIG. 3.

Figure 14:
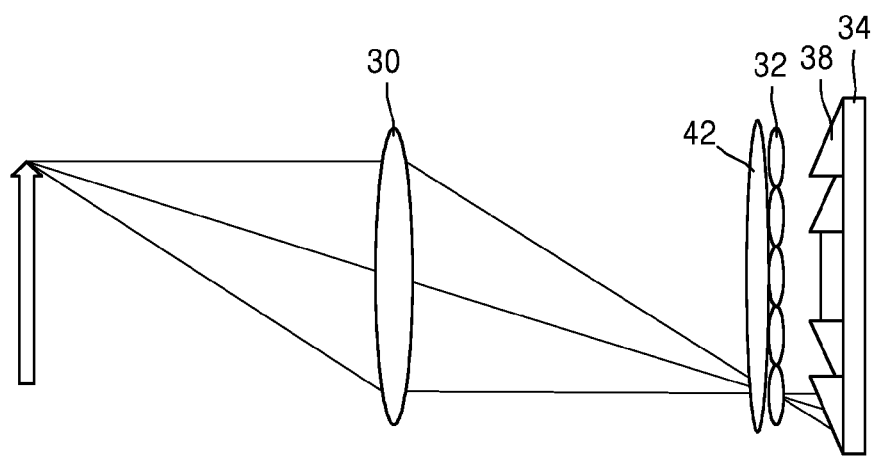

FIG. 14 shows a configuration in which the micro-lens array 32 of FIG. 1 is replaced by the first lens unit of FIG. 6 and the image sensor 34 of FIG. 1 is replaced by the second image sensor unit of FIG. 4.

Figure 15:
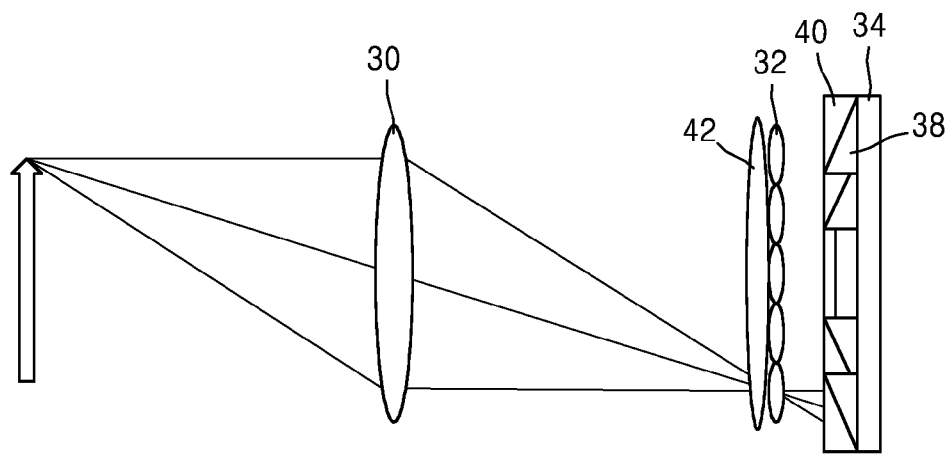

FIG. 15 shows a configuration in which the micro-lens array 32 of FIG. 1 is replaced by the first lens unit of FIG. 6 and the image sensor 34 of FIG. 1 is replaced by the third image sensor unit of FIG. 5.

Figure 16:
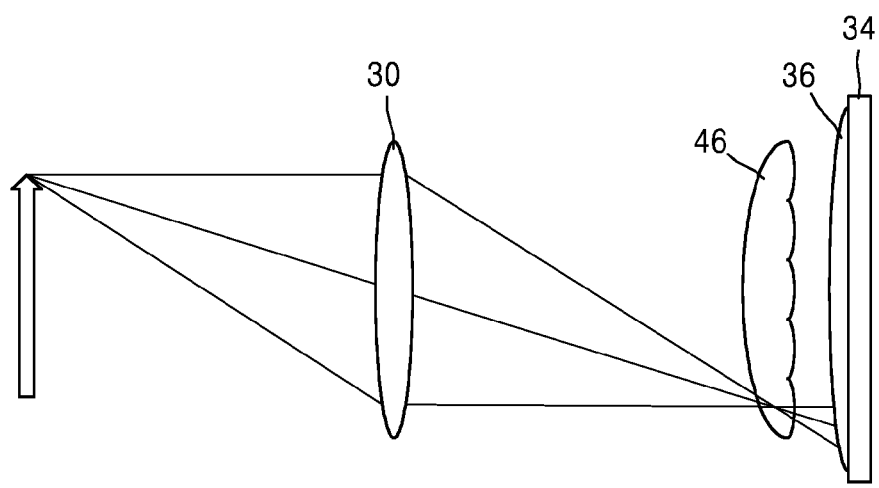

FIG. 16 shows a configuration in which the micro-lens array 32 of FIG. 1 is replaced by the third lens unit (the resultant product 46) of FIG. 8 and the image sensor 34 of FIG. 1 is replaced by the first image sensor unit of FIG. 3.

Figure 17:
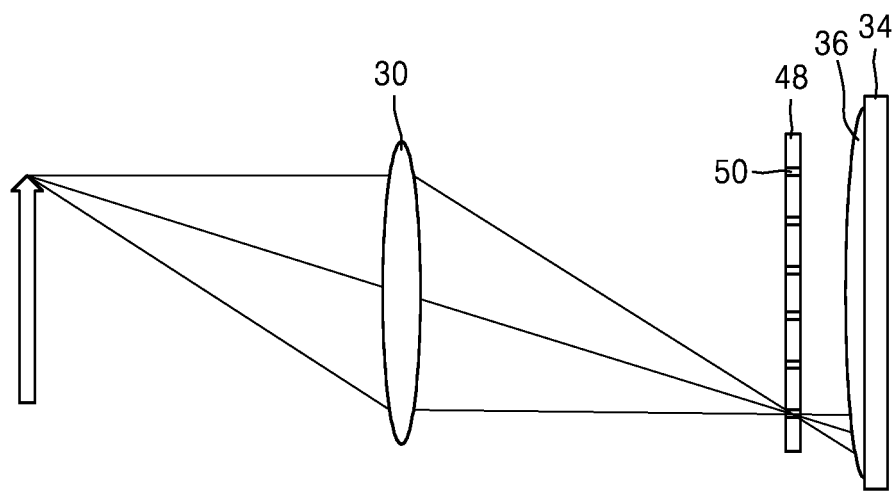

FIG. 17 shows a configuration in which the micro-lens array 32 of FIG. 1 is replaced by the liquid crystal panel 48 of FIG. 9 and the image sensor 34 of FIG. 1 is replaced by the first image sensor unit of FIG. 3.

Figure 18:
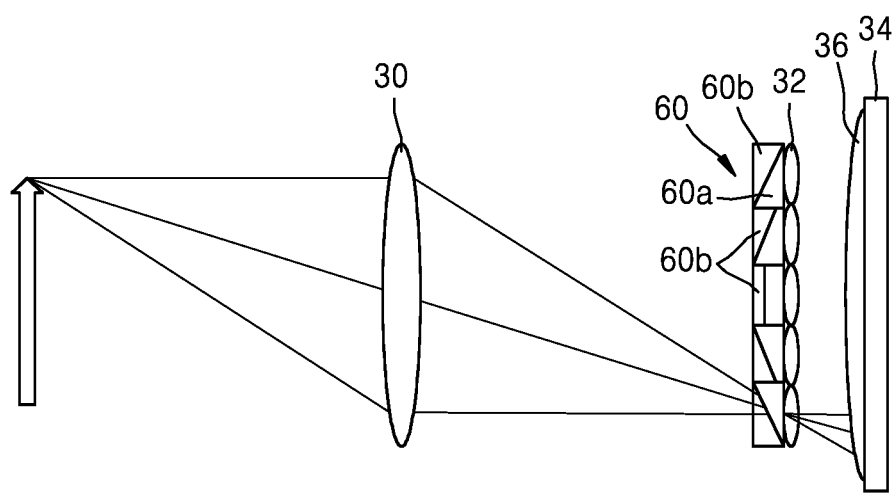

FIG. 18 shows a configuration in which the micro-lens array 32 of FIG. 1 is replaced by the fourth lens unit of FIG. 12 and the image sensor 34 of FIG. 1 is replaced by the first image sensor unit of FIG. 3.

Figure 19:
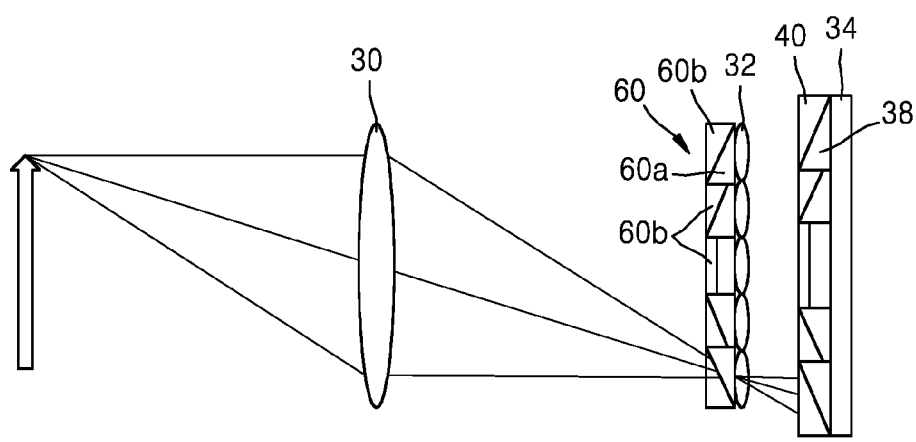

FIG. 19 shows a configuration in which the micro-lens array 32 of FIG. 1 is replaced by the fourth lens unit of FIG. 12 and the image sensor 34 of FIG. 1 is replaced by the third image sensor unit of FIG. 5.

In the lens unit and the image sensor unit according to an exemplary embodiment, a Fresnel lens, a holographic optical element (HOE), or a diffraction optical element may be used as a waveform conversion element (device) for elements except for the micro-lens array 32 and the image sensor 34.

The convex lens material layer 36 of FIG. 3, the convex lens 42 of FIG. 6 and/or the material layer 44 of FIG. 7 may be active material layers, refractive indexes or radius curvatures of which may be changed by applying voltage, and may be, for example, liquid crystal lens layers.

In the light-field camera according to exemplary embodiments, of light that enters the main lens from an object, an image having the same focal distance with respect to light that forms a small angle with an optical axis and light that forms a large angle with the optical axis may be obtained. That is, the entire image sensor may be used for receiving a light-field. Accordingly, noise of light that is incident to edge portions of the micro-lens array may be reduced, and thus, correct light-field information having increased optical efficiency may be obtained.

In order to obtain a field image having high resolution by locating the micro-lens array and the image sensor at distances different from the focal distance of the main lens, a light field may be obtained while maintaining a wide field of view with respect to the image, and thus, 3-dimensional information having a wide viewing angle may be obtained.

While one or more exemplary embodiments have been described with reference to the figures, it will be understood by those of ordinary skill in the art that various changes in form and details may be made therein without departing from the spirit and scope as defined by the following claims.

What is claimed is:

1. A light-field camera, comprising:
a main lens configured to form an image of an object;
a lens configured to form, on a curved surface, additional images based on the image of the object; and
an image sensor configured to function as a curved image sensor and thereby sense the additional images,
wherein at least one of the lens and the image sensor comprises a flat element,
wherein the lens is provided on a Petzval surface of the main lens and has a same curvature as the Petzval surface, and
wherein the main lens and the lens are configured such that the image formed by the main lens is located between the lens and the main lens.

2. The light-field camera of claim 1, wherein the lens has a convex light-incident surface and comprises a light-exit surface having a plurality of micro-lens shapes.

3. A light-field camera, comprising:
a main lens configured to form an image of an object;
a lens configured to form, on a curved surface, additional images based on the image of the object; and
an image sensor configured to function as a curved image sensor and thereby sense the additional images,
wherein at least one of the lens and the image sensor comprises a flat element, and
wherein the lens comprises a first waveform conversion element and a flat micro-lens array, and the image sensor comprises a second waveform conversion element and a flat image sensor.

4. The light-field camera of claim 1, wherein the additional images have different parallax from each other.

5. The light-field camera of claim 1, wherein the lens comprises a curved micro-lens array.

6. The light-field camera of claim 5, wherein the main lens and the curved micro-lens array are configured such that the image formed by the main lens is spaced apart from the curved micro-lens array by a minimum radius of curvature of the curved micro-lens array.

7. The light-field camera of claim 1, wherein the image sensor comprises a waveform conversion element configured to convert a waveform of light incident thereon, the light forming the additional images, and a flat image sensor configured to sense the additional images based on the converted waveform.

8. The light-field camera of claim 7, wherein the waveform conversion element comprises a material layer that covers a light-incident surface of the flat image sensor and has a positive power.

9. The light-field camera of claim 7, wherein the waveform conversion element comprises a prism lens layer having a positive power.

10. The light-field camera of claim 7, wherein the waveform conversion element comprises an electrowetting prism layer.

11. The light-field camera of claim 7, wherein the waveform conversion element comprises a Fresnel lens, a holographic optical element (HOE), or a diffraction optical element (DOE).

12. A light-field camera, comprising:
a main lens configured to form an image of an object;
a lens configured to form, on a curved surface, additional images based on the image of the object; and
an image sensor configured to function as a curved image sensor and thereby sense the additional images,
wherein at least one of the lens and the image sensor comprises a flat element,
wherein the lens comprises:
a waveform conversion element configured to convert a waveform of light incident thereon, the light forming the additional images; and
a flat micro-lens array contacting the waveform conversion element, and
wherein the image sensor which is configured to function as the curved image sensor is configured to sense the additional images based on the converted waveform.

13. The light-field camera of claim 12, wherein the waveform conversion element comprises a lens having a positive power.

14. The light-field camera of claim 12, wherein the waveform conversion element comprises a material layer that covers a light-incident surface of the flat micro-lens array and has a positive power.

15. The light-field camera of claim 12, wherein the waveform conversion element comprises a prism lens layer having a positive power.

16. The light-field camera of claim 12, wherein the waveform conversion element comprises an electrowetting prism layer.

17. The light-field camera of claim 12, wherein the waveform conversion element comprises a Fresnel lens, a holographic optical element (HOE), or a diffraction optical element (DOE).

18. A light-field camera, comprising:
a main lens configured to form an image of an object;
a liquid crystal panel configured to form a 2-dimensional image or a 3-dimensional image based on the image of the object; and
an image sensor configured to sense the 2-dimensional image or the 3-dimensional image,
wherein the liquid crystal panel is provided on a Petzval surface of the main lens and has a same curvature as the Petzval surface.

19. The light-field camera of claim 18, wherein the image sensor further comprises a waveform conversion element configured to convert a waveform of light incident thereon, the light forming the 2-dimensional image or the 3-dimensional image.

20. A light-field camera comprising:
a lens configured to receive light incident thereon; and
a first optical system comprising:
a micro-lens array disposed behind the lens;
an image sensor disposed behind the micro-lens array; and
a waveform conversion element configured to convert a waveform of the incident light between the micro-lens array and the image sensor,
wherein the image sensor is flat, and
wherein the micro-lens array is provided on a Petzval surface of the lens and has a same curvature as the Petzval surface.

* * * * *